Feb. 7, 1950 — R. BALZER — 2,496,689
ARTICLE DISPENSING MACHINE
Filed July 11, 1947 — 6 Sheets-Sheet 1
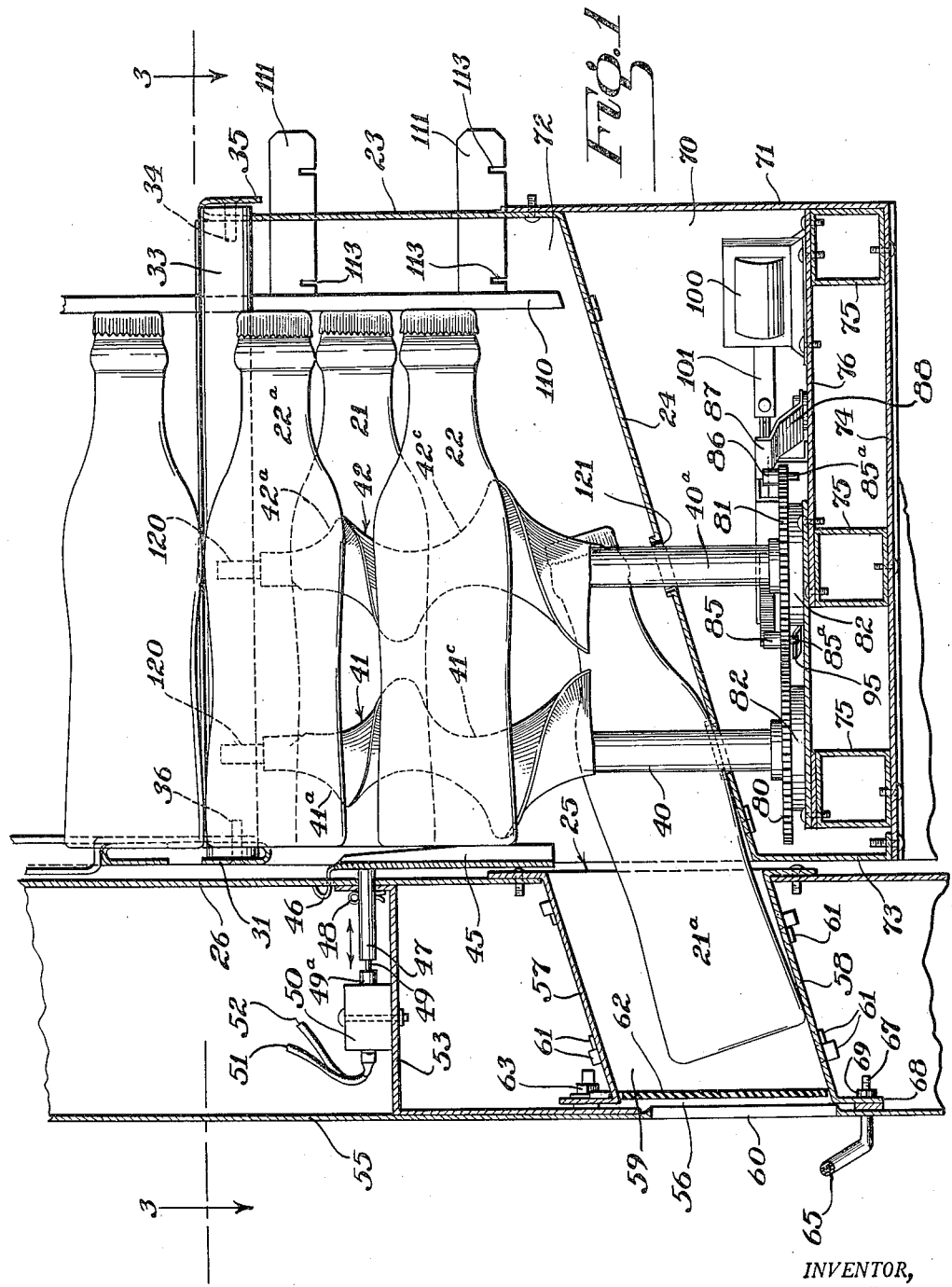
INVENTOR,
Rudolf Balzer
BY
Christian R. Nielsen
ATTORNEY

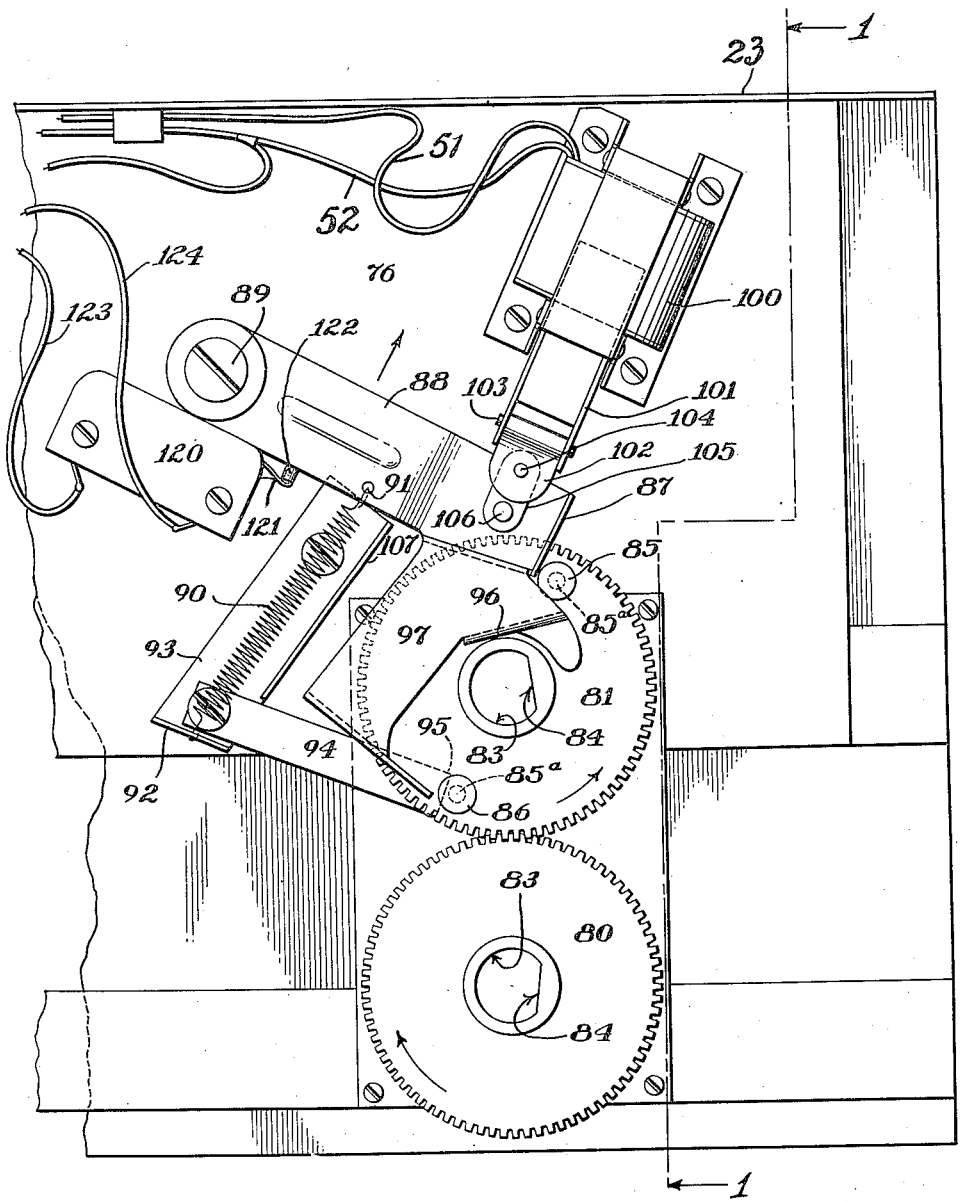

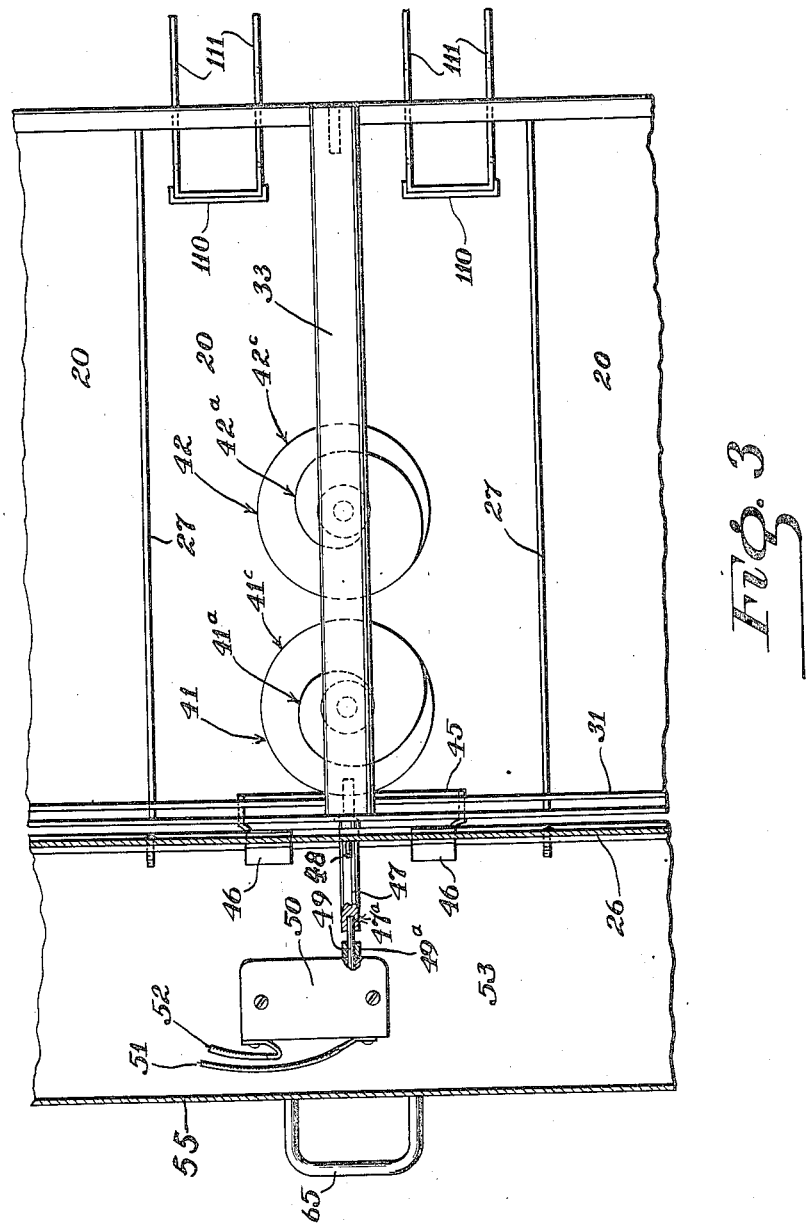

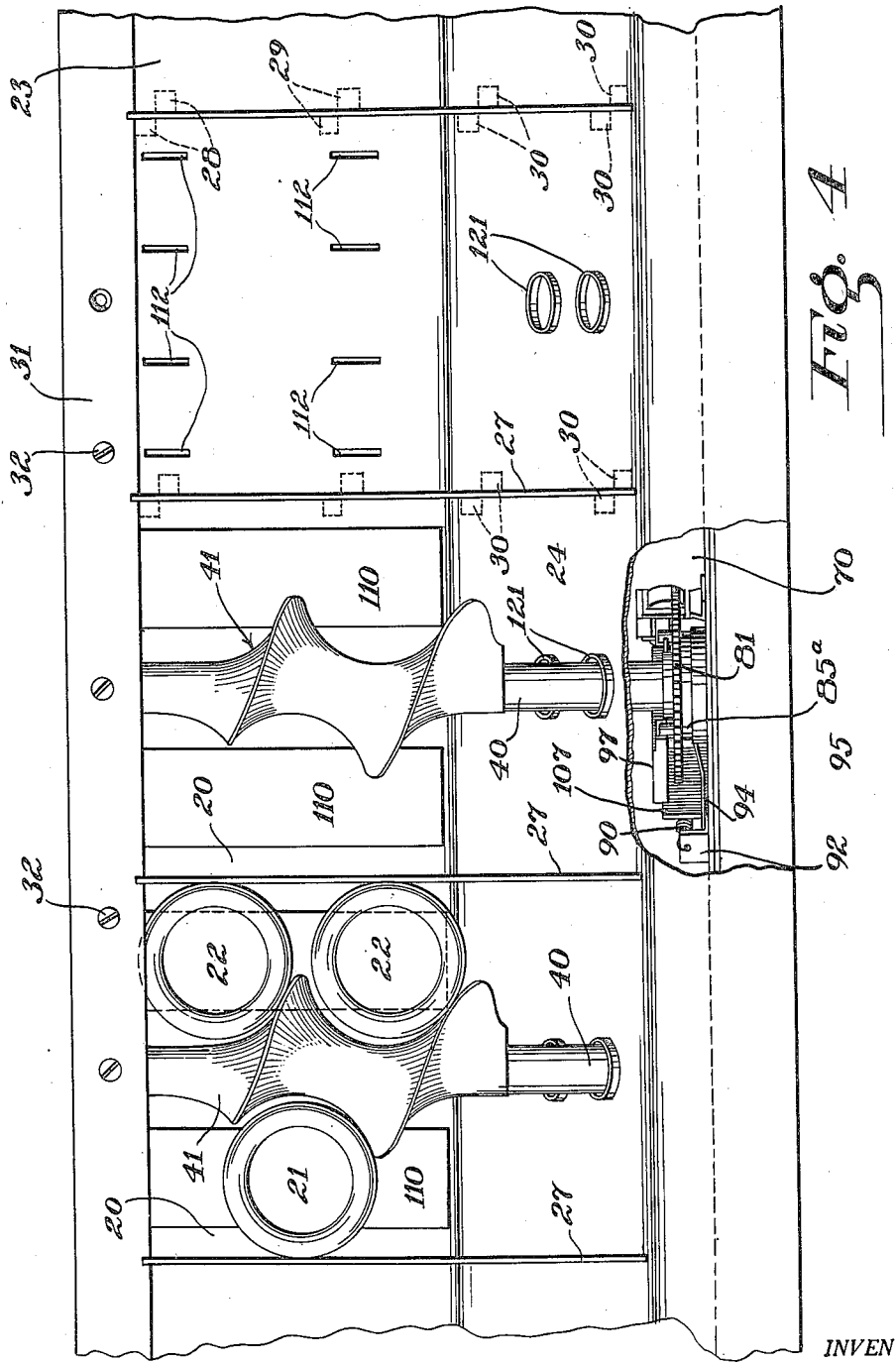

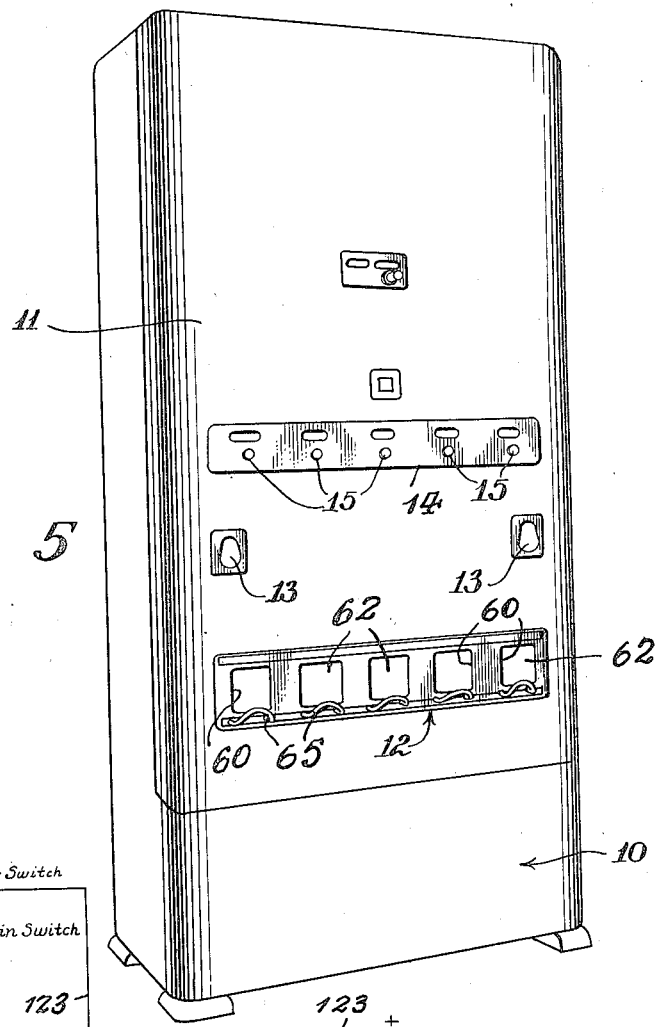
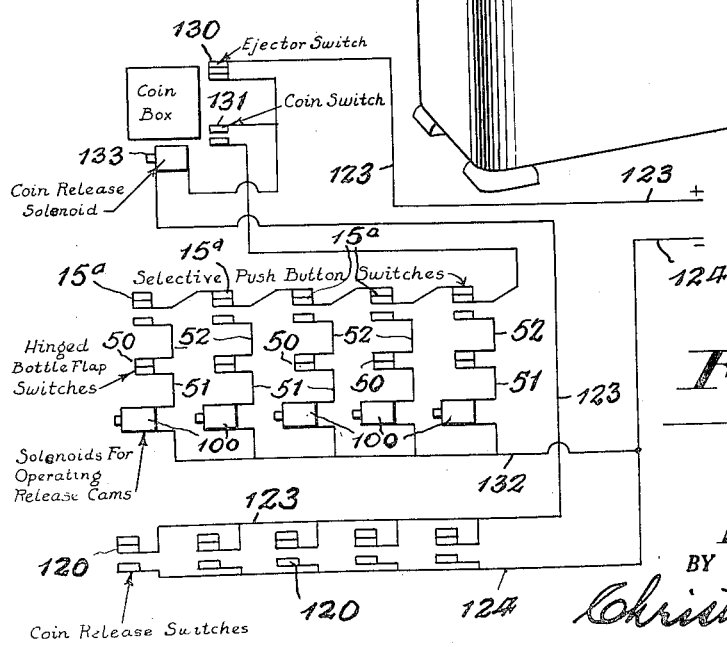

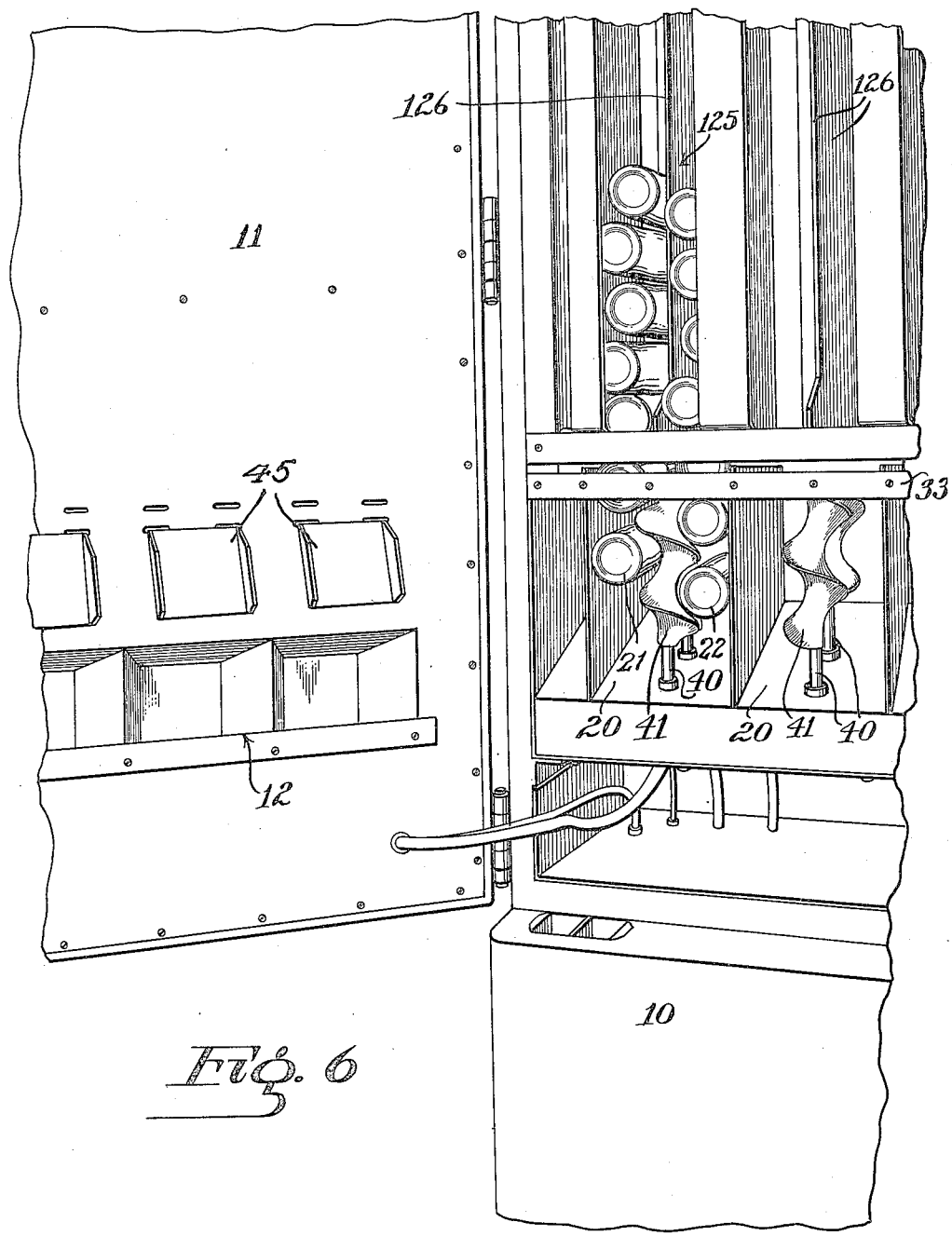

Patented Feb. 7, 1950

2,496,689

UNITED STATES PATENT OFFICE 2,496,689

ARTICLE DISPENSING MACHINE

Rudolf Balzer, West Springfield, Mass.

Application July 11, 1947, Serial No. 760,195

17 Claims. (Cl. 312—48)

This invention relates to article dispensing machines.

An object of the invention is the provision of an article dispensing machine in which spaced spirals having vertical axis and arranged in pairs not only support columns of horizontally disposed articles but are rotated by the weight of said articles through a predetermined angle until stopped by a mechanical means which is releasable by the insertion of a coin in a slot for closing a circuit to a solenoid which controls actuation of the mechanical means.

Another object of the invention is the provision of a dispensing machine which includes a cabinet having a protected opening for the discharge of articles, vertically disposed pairs of spirals supporting vertical columns of articles while controlling the discharge of said articles, the weight of the articles causing rotation of the spirals through a predetermined angle when a stop mechanism is released by a coin-controlled device, said spirals being so constructed that they will lower the descending articles in stages and finally release each lowermost article while supporting the vertical column of articles out of contact with the article which is being discharged.

A further object of the invention is the provision of an article dispensing machine in which the vertical columns of horizontally positioned articles are lowered progressively by means of a pair of spirals with cooperating side walls of a dispensing machine maintaining the articles in contact with said spirals, said spirals being so constructed that they will support the articles at a higher level when the lowermost article is being discharged, a switch lever being mounted in the path of the descending article and held in a predetermined position by said articles for closing an electric circuit which causes actuation of a mechanism controlling partial rotation of the spirals through approximately 180 degrees for dispensing an article when a coin is inserted in the usual slot to complete the circuit to the controlling mechanism, said switch device being moved to an inoperative position when the last article in the dispensing machine is discharged, the weight of an article or articles supported by the spirals causing the partial rotation of the spirals.

A still further object of the invention is the provision of an article dispensing machine in which vertical columns of horizontally disposed articles are lowered progressively by means of a pair of spirals which cooperate with a pair of speed side walls, adjustable end plates and a swingable plate operating as a switch lever for an electric circuit, for confining the columns to a pair of vertical paths in the machine at each side of the pair of spirals, the adjustable end plates engaging one end of each of the articles for maintaining the other ends of said articles pressed against the swingable plate for aiding in retaining the electric circuit closed, said circuit being completed when a coin is inserted in the usual slot, said spirals being rotated through an angle of 180 degrees by the weight of an article or articles in the vertical paths, but normally held against rotation by a stop mechanism which is released by a solenoid when energized by the electric circuit through the closure of the switch lever and a switch actuated by the insertion of a coin.

Another object of the invention is the provision of an article dispensing machine in which pairs of spirals having vertical axes are especially constructed for not only supporting pairs of columns of horizontally disposed articles but for lowering said articles in the columns progressively for release to a discharge chute, the articles being released alternately from the pairs of columns, the weight of the articles in the columns causing rotation of the spirals which are held normally against rotation by a stop mechanism that is released temporarily when a coin sets in motion a coin-controlled device.

A still further object of the invention is the provision of a dispensing machine encased in a refrigerator, a pair of spirals being rotated through an angle of 180 degrees by the weight of a pair of vertical columns of articles for releasing articles alternately from the columns when a coin sets in motion a coin-controlled device for closing an electric circuit which energizes a solenoid for releasing a stop mechanism normally holding the spirals from rotating by the downward pressure of the columns of articles, a plate being hinged at one end on a wall of the passageway for the columns of articles, with the free end of the plate being disposed downwardly from the hinged end thereof and outwardly from said wall so that said free end will be engaged by one of the ends of each of the articles and forced against the wall for closing a switch in the circuit as long as there is an article in the passageway, the release of the hinged plate when said passageway is empty of articles causing a breaking of the circuit and preventing futile operation of the dispensing machine.

The invention consists in the novel construction, arrangement and combinations of parts hereinafter more particularly described and claimed.

For the sake of description, I have specifically referred to the dispensing of bottled beverages, but the invention is not limited thereto and may be employed for dispensing numerous articles.

In the drawings,

Figure 1 is a vertical section through a single dispensing unit taken along the line 1—1 of Figure 2.

Figure 2 is a plan view of an operating mechanism for a single dispensing unit shown removed from the bottle dispensing machine.

Figure 3 is a horizontal section taken along the line 3—3 of Figure 1.

Figure 4 is a fragmentary front view in elevation of a number of dispensing chambers with the front wall or partition removed.

Figure 5 is a view in perspective of the complete bottle dispensing machine embodied in a refrigerator.

Figure 6 is a view in perspective of the refrigerator with the door open to disclose the relative positions of the dispensing elements and the vertical storage compartments, and Figure 7 shows an electric wiring diagram of the controlling circuits for a five unit dispensing machine.

Referring more particularly to Figure 5 of the drawings, 10 designates a casing of a refrigerator provided with a hinged door 11. The door is provided with a narrow elongated passage 12 through which chilled bottles containing liquid refreshments are discharged in predetermined paths as will be presently explained. Said door is provided with a pair of devices 13 for removing caps from the bottles.

A plate 14 covers an elongated opening in the door and is provided with a plurality of push buttons 15 which are operated selectively. The push buttons actuate a series of switches 15ª for completing an electric circuit to cause actuation of a particular dispensing mechanism. Indicia (not shown) is applied to each push button for designating the kind of beverage which may be obtained by the insertion of a coin of proper denomination.

Referring more particularly to Figures 1 and 3, it will be seen that a housing made of metal is divided into a plurality of similarly constructed dispensing chambers 20. Each chamber is adapted to receive two vertical columns of bottles 21 and 22 which are separated by a pair of spirals of particular formation with the longitudinal axes of said spirals being in a vertical plane (Figures 1 and 4) passing longitudinally and centrally through each chamber. The chambers have a common rear wall 23 and a common floor 24 which is inclined downwardly from said rear wall to openings 25 in a front partition 26 (Figure 1).

The various chambers 20 are isolated from each other by vertical parallel partitions 27. These partitions are supported at the rear ends by lugs 28 and 29 projecting from the rear edges of said partitions and received by slots in the rear wall 23 Figure 4. The lower edges of said partitions are sheared off at an angle to conform to the inclination of the bottom 24. Integrally formed lugs 30 on said partitions project through slots in the bottom and are bent flat against the under surface of said bottom for securing the lower edges of the partitions to said bottom. The upper front ends of the partitions are attached to a U-shaped bar 31 in any approved manner. This bar is secured to the upper edge of the front partition by screws 32 and runs the length of the combined dispensing chambers. A bar 33 is secured to one end by a screw 34 to a down-turned flange 35 on the upper edge (Figure 1) of the rear wall 23 while the other end is secured by a screw 36 to the outer flange of the U-shaped bar 31. It will be noted that the inner flange of the bar 31 and the rear wall 23 are cut away to form substantially rectangular slots to receive the ends of said bar 33 which is substantially rectangular in cross section in order to retain said bar from rocking. Each chamber 20 contains a bar 33 which runs lengthwise thereof and which has its longitudinal axis disposed in the vertical plane passing through the vertical axis of shafts 40 and 40a upon which the spirals 41 and 42 are formed respectively.

A plate 45 is loosely hinged at 46 on the front partition 26 (Figures 1 and 3) in each of the chambers 22 in such a manner that the lower free end tends to swing inwardly for engagement with the bottoms of the descending bottles 21 and 22.

A rod 47 has a socket 47a to receive one end of an actuating pin 49 for a micro switch 50. This pin is slidable in a sleeve 49a projecting from the switch casing and a spring (not shown) forces the pin outwardly of the casing. A cotter pin 48 limits the inward movement of the rod 47. Said switch aids in completing an electric circuit to a solenoid when the rod 47 is forced outwardly by the plate 45, as will be presently explained. Wires 51 and 52 form part of said circuit. A shelf 53 supports a plurality of switches 50. It is to be borne in mind that each chamber is supplied with a plate 45, an associated sleeve 47 and a switch.

A front wall 55 is spaced from the partition 26, and the shelf 53 is connected between the front wall and said partition. In the space between the wall and partition and below the shelf 53 are a plurality of discharge chutes 56 defined by inclined top and bottom walls 57 and 58 and side walls 59 which converge towards each other at the outer ends and aline with the side edges of the discharge openings 60 in the front wall 55. The outer edges of the top and bottom walls 57 and 58 aline respectively with side edges of the openings 60. The top and bottom walls have flanges at the opposite edges and said flanges are bolted to the adjacent partition and front wall (Figure 1). The side walls 59 have spaced integrally formed lugs 61 which are inserted through appropriate slots in the top and bottom walls and are bent over to retain the side walls in place.

A relatively stiff rubber flap 62 has its upper end forced through a slot at the outer end of the top wall 57. Said flap hangs downward over the opening 60 and at the rear thereof for substantially closing said opening. The lower free end of said flap is pushed outwardly through the opening by the bottom of a bottle when said bottle is discharged. Upon inspection of Figure 5 it will be seen that a plurality of flaps 62 and corresponding openings 60 aline with the discharge passage 12 in the door of the cabinet 10.

A combined stop and buffer 65 for the sliding bottles which are being discharged from the openings 60 is located in front of each of said openings and carried by the front wall 55 (Figures 1 and 5). The buffer is formed from a strong wire heavily covered with rubber. The ends 67 of the wire are threaded and project through aligned passages in the front wall 55 and a flange 58. Nuts 69 are threaded onto said ends for retaining the buffers in place. Said threaded ends 67 and the nuts serve to secure the flange 68 to the front wall.

Below the inclined bottom wall 24 of the dispensing chambers 20 is a compartment 70 (Figures 1 and 4) for housing a plurality of operating units (Figure 2) for releasing the pairs of spirals 41 and 42 so that they may be revolved through approximate 180 degrees by the weight of one or more bottles. One unit only is shown in Figure 2, but all of the units are identical and a unit is provided for each dispensing chamber. The compartment 70 is confined between the inclined wall 24, a rear wall 71 which supports the wall 23, the lower ends of end walls 72 of the housing, a front wall 73, and a base 74. Tubular bars 75, rectangular in cross section, are secured between the base 74 and a floor 76 supporting an electrically operated control mechanism for permitting rotation of the spirals through an angle of approximately 180 degrees.

Referring more particularly to Figures 1 and 2, it will be seen that a pair of horizontally disposed intermeshing gears 80 and 81 are mounted for rotation in bearings 82 carried by the floor 76. These gears are rotated in the direction indicated by the arrows in Figure 2. Each gear is provided with a central opening 83 which is substantially circular except for a straight portion 84. The openings are adapted to receive the lower ends of the shafts 40 and 40a. Said lower ends of the shafts have the same configuration in cross section as the openings 83 so that they will fit neatly within the openings 83 in the respective gears 80 and 81. In other words, the lower ends of said shafts are substantially circular but are provided with a flat side similar to the flat portion 84 of the openings 83. The cooperating flat portions on the shafts and in the openings 83 having a double function in that said flat portions properly position the spirals 41 and 42 and connect the shafts to the gears for simultaneous rotation.

The gear 81 is provided with a pair of diametrically and vertically disposed pins 85 and 86 rising from the upper surface of the said gear. Each pin has a projection 85a extending downwardly from the lower face of the gear. The pins 85 and 86 are adapted to be engaged alternately by a lug or stop 87 on the free end of a lever 88 pivoted at 89 on the floor 76. A spring 90 has one end secured at 91 to the lever 88 and the other end attached to a flange 92 on a bracket 93 which is secured to the floor 76. A spring 94 has one end secured to the bracket 93 while the curved free end 95 is located below the gear 81 and in a position for the projections 85a to ride over the free end of said spring and be engaged by said end to prevent reverse rotation of the gears 80 and 81 and likewise the spirals 41 and 42. The lever has a cam 96 on an integrally formed plate 97 extending over the gear 81.

A solenoid 100 is mounted on the floor 76 adjacent the free end of the lever 88 and is provided with a core 101 projecting toward said lever. A clip 102 formed of brass receives a pin 103 carried by the free end of the core. The flanges of the clip are pivoted at 104 to a link 105 which is pivoted on the free end of the lever as shown at 106. The brass connecting clip 102 prevents the gears 80 and 81, the lever 88 and associated parts from becoming magnetized.

A vertical flange 107 of the bracket 93 is adapted to be engaged by the lever 88 for limiting rocking movement of said lever when the spring 90 returns said lever and associated parts to the position shown in Figure 2. The flange 107 cooperates with the flange 92 for maintaining the up-turned free end 95 of the spring in position to be engaged by the projections 85a (Figures 1 and 2).

Adjustable guides or plates 110 are held in vertical positions by pairs of fingers 111 which are received by slots 112 formed in the wall 23 (Figures 1, 3 and 4). Each finger is provided with a plurality of spaced notches 113 (Figure 1) to engage over the metal of the wall 23 below the slots 112 for retaining said guides in place. It will be noted from Figure 1, that one end of each of the bottles 21 and 22 in each of the vertical rows of bottles are in contact with the adjacent guide. The other ends of the bottles press against the swingable plate 45 for maintaining the switch 50 closed. Said guides may be adjusted towards or away from the wall 23 to take care of bottles of varying lengths.

The upper reduced ends 120 of the shafts 40 and 40a have bearings in the longitudinal bar 33 (Figure 1). The lower ends of said shafts pass through flanged openings 121 formed in the inclined bottom wall 24. The members 41 and 42 are specially constructed for supporting and dispensing bottles from alternate columns in each dispensing chamber 20 and for causing rotation of said members when bottles are resting on the convolutions of the spirals. The convolutions of the spiral 41 are oppositely turned from the convolutions of the spiral 42 and these spirals revolve in opposite directions. The portions of the spirals designated by the numbers 41a and 42a (Figure 1) not only support the bottle 22a but also all bottles resting on the bottle 22a while the helix formed by the convolutions 41c and 42c progressively lower the bottles 21 and 22 which are now moving towards the releasing level in the dispensing chamber. However, the bottle 21a is being discharged during the above operations.

The pitch of the convolutions 41c and 42c of the helical portions of the spirals 41 and 42 is determined by the diameter of said bottles in a dispensing chamber (Figures 1 and 4). The diameter of said bottles also determines the spacing of the partitions 27 from the vertical plane passing through the vertical axes of the spirals. However, bottles of smaller diameters such as are commonly used for bottled beverages may be dispensed without altering the pitch of the spirals or the spacing of the partitions. This is made possible by the specially developed helix 41a and 42a on the upper part of spirals 41 and 42. As clearly shown in Figure 1, the portions 41a and 42a have a pitch less than the portions 41c and 42c of the spirals.

A coin release switch 120 of standard construction is shown in Figure 2. This switch is provided with a lever 121 which retains the switch normally open because a pin 122 carried by the lever 88 presses against the lever 121 when the parts shown in Figure 1 are in inoperative positions and one of the pins 85 or 86 is pressing against the stop 87 on the lever 88. When the lever 88 is rocked for moving the stop away from the contacting pin, the pin 122 releases the lever 121 and the circuit to the coin-controlled mechanism (not shown) is closed temporarily to release the coin so that the dispensing machine may be in condition for continued operation.

As shown in Figure 6, storage chambers 125 for the bottles extend upwardly from the dispensing chambers 20. The storage chambers are divided vertically and centrally by partitions 126 for maintaining the bottles in vertical columns so that the columns of bottles will be guided on opposite sides of the vertical plane passing through the vertical axis of the spirals 41 and 42 in each of the dispensing chambers. The storage chambers are chilled by the refrigerator.

The partitions 126 of the storage chambers may be made of corrugated materials. The partitions 27 which separate the dispensing chambers may also be corrugated to provide a certain degree of flexibility.

In Figure 7 a wiring diagram illustrates a hook-up for a five unit machine, attention being now invited to such figure. Positive and negative wires 123 and 124 supply current to the several circuits of the mechanism. The positive wire 123 is in circuit with one side of an ejector switch 130, the opposite side being connected to one blade of a coin switch 131. The opposite blade of switch 131 is electrically connected to one side of a series of selective push button switches 15a establishing a circuit through respective switches 50 through the line 52. The opposite side of the switches 50 is connected to respective solenoids 100 by the line 51. The solenoids 100 are in circuit with the negative side 124 by reason of the line 132. The coin release switches 120 have one side in circuit with the negative line 124, the opposite side being in circuit with the positive side 123, the line being continued to a coin release solenoid 133 and from thence to the coin switch 131. It will be seen that coin switch 133 will be closed when the proper coin is placed in the coin slot to initiate operation of the dispenser.

The operation of the dispensing machine is as follows:

The storage chambers 125 over each of the dispensing chambers 20 are filled with bottles containing beverages as indicated by the indicia on the plate 14 and beneath the button 15 (Figure 5). The horizontally disposed bottles in the vertical columns are supported by the convolutions 41a and 42a of the respective spirals 41 and 42 (Figure 1). The spirals may be released a sufficient number of times in each of the dispensing chambers 20 until the bottle 21a is discharged and the machine is now ready for dispensing the bottles. The discharge of the bottle 21a in each chamber 20 is accomplished by inserting the proper coin in the coin slot and pushing a selected button 15 in the door 11 of the refrigerator.

It is important before filling the various storage chambers 125 to adjust the guides 110 in the dispensing chambers 20 so that when the caps on the bottles are in engagement with said guides the bottoms of said bottles will press the swingable plate 45 against the partition 26 for closing the switch 50 (Figure 1). Otherwise the machine cannot be operated because said plate when released by the discharge of the last bottle in the two vertical columns in any of the dispensing chambers swings inwardly of said chamber and opens the associated switches 50.

When a coin is placed in the slot, the switch 131 (Figure 7) will be closed and the circuit will be completed to the solenoid 100 upon actuation of a switch 15a through actuation of a selected push button 15 which instantly draws the core 101 inwardly thereby rocking the lever 88 in the direction indicated by the arrow in Figure 2 and moving the stop 87 away from the pin 85 on the gear 81. As the lever is oscillated, the plate 97 is moved in the same direction causing the cam 96 to engage the pin 85 and to shift said pin for slightly rocking the gear 81 in the direction indicated by the arrow. The pin is now free of the stop on the lever 88 and the initial rocking of the gear starts the bottles downwardly in the column with the weight of said bottle continuing the rotation of the gear 81 and the intermeshing gear 80 until the pin 86 travels through 180 degrees.

The energization of the solenoid is only momentary and is sufficient to draw the core inwardly to release the pin 85 from the stop and cause the cam 96 to shift said pin as has been explained. When the lever is oscillated in the direction indicated in Figure 2, the pin 122 on said lever is carried away from the switch arm 121 and said lever closes the switch 120 (Figure 2) and the circuit to the coin-release mechanism which causes discharge of the coin thereby opening the circuit to the solenoid. The lever 88 is then returned to its position shown in Figure 2 in time to place the stop 87 in the path of the approaching pin 86 on the gear 81. The dispensing machine is now ready for operation by the insertion of another coin.

The pins 85 and 86 on the gear 81 have a definite relation with respect to the initial bottle supporting convolutions 41a and 42a on the spirals 41 and 42 so that when the spirals are rotated through an angle of 180 degrees said convolutions will be moved from one of the bottle channels in the chambers 20 to the other bottle channel at the other side of the aligned spirals (Figure 1) for supporting the bottles 22a and the oncoming bottles in one vertical column for eliminating the weight of the upper bottles from the bottle 22 while said bottle is moving into the helical portion 41c and 42c of the spirals. The next semicircular rotation of the spirals causes the convolutions 41a and 42a to shift to the other vertical channel in the dispensing chamber containing the bottles 21 and 21a for supporting that one of the bottles which has fallen to the horizontal level of the bottle 22a. It will be noted from Figure 2 that the pins 85 and 86 shift alternately from one side of the vertical plane passing through the vertical axis of the gears 81 and 80 and the shafts 40. This shifting of the pins conforms to the movements of the convolutions 41a and 42a.

The flaps 62 substantially close the openings 60 at the outer ends of the discharge chute 56 so that there is little loss of cold air from the dispensing chambers 20. The bottoms of the bottles push the flaps outwardly and the bottles are stopped in their outward run by the buffer 65. The discharge chutes have a slightly higher temperature than the dispensing chambers 20 and this higher temperature together with the flaps which check the speed of the descending bottles tends to prevent a sudden rise in temperature of the chilled bottle thereby eliminating the danger of the bottles exploding which occasionally happens. Furthermore, the explosion of the bottle would take place as the lower end thereof starts to move the flap 62 so that the customer would be protected.

Figures 1 and 2 show a complete dispensing unit for one kind of bottled beverage. A number of the units are placed side by side in the refrigerating cabinet 10 (Figure 6) for dispensing various kinds of beverages or for dispensing one kind only. The units, however, are independent of each other and are set in motion by the depression of the selected push button 15.

The coin controlled mechanism is shown diagrammatically only since any well known type or conventional construction may be employed. Furthermore, such mechanism forms no part of the present invention except as a means to an end.

I claim:

1. A bottle dispensing machine comprising a cabinet having a dispensing chamber therein provided with an inclined floor leading downwardly to a discharge opening in the cabinet, side walls and end walls enclosing said chamber, one end wall having a discharge opening alining with the discharge opening in the cabinet, a pair of spaced vertical spirals located midway of the side walls and formed on axial shafts, bearings for the opposite ends of the shafts, a gear connected to the lower end of each shaft, said gears being in intermeshing relation, diametrically disposed pins on one gear, a lever provided with a stop adapted to engage the pins alternately, a magnetic means for moving the lever and stop away from one of the pins, the weight of the bottles causing rotation of the spirals, said stop and pins limiting each rotation of the spirals to 180 degrees, an electric circuit included in the magnetic means, means for closing said circuit, means actuated by the lever for causing breaking of the circuit, and a spring returning the lever and stop in time for the stop to contact the other pin on the gear, each semi-circular rotation of the spirals causing a bottle to be discharged.

2. A bottle dispensing machine comprising a cabinet having a dispensing chamber therein provided with an inclined floor leading downwardly to a discharge opening in the cabinet, side walls and end walls enclosing said chamber, one end wall having a discharge opening alining with the discharge opening in the cabinet, a pair of spaced vertical spirals located midway of the side walls and formed on axial shafts, bearings for the opposite ends of the shafts, a gear connected to the lower end of each shaft, said gears being in intermeshing relation, diametrically disposed pins on one gear, a lever provided with a stop adapted to engage the pins alternately, a magnetic means for moving the lever and stop away from one of the pins, means on the lever engageable with said pin for urging the pin forwardly and for initiating rotation of the pin-equipped gear, the weight of the bottles causing rotation of the spirals, said stop and pins limiting each rotation of the spirals to 180 degrees, an electric circuit included in the magnetic means, means for closing said circuit, means actuated by the lever for causing breaking of the circuit, and a spring returning the lever and stop in time for the stop to contact the other pin on the gear each semi-circular rotation of the spirals causing a bottle to be discharged.

3. A bottle dispensing machine comprising a cabinet having a dispensing chamber therein provided with an inclined floor leading downwardly to a discharge opening in the cabinet, side walls and end walls enclosing said chamber, one end wall having a discharge opening alining with the discharge opening in the cabinet, a pair of spaced vertical spirals located midway of the side walls and formed on axial shafts, bearings for the opposite ends of the shafts, a gear connected to the lower end of each shaft, said gears being in intermeshing engagement, diametrically disposed pins on one gear, a lever provided with a stop adapted to engage the pins alternately, a magnetic means for moving the lever and stop away from one of the pins, a cam on the lever and contacting the last-mentioned pin as the stop is moved away from said pin for urging the pin forwardly and initiating rotation of the gears and spirals, the weight of the bottles causing rotation of the spirals, said stop and pins limiting each rotation of the spirals to 180 degrees, an electric circuit included in the magnetic means, means for closing said circuit, means actuated by the lever for causing breaking of the circuit, and a spring returning the lever and stop in time for the stop to contact the other pin on the gear, each semi-circular rotation of the spirals causing a bottle to be discharged.

4. A bottle dispensing machine comprising a cabinet having a dispensing chamber therein provided with an inclined floor leading downwardly to a discharge opening in the cabinet, side walls and end walls enclosing said chamber, one end wall having a discharge opening alining with the discharge opening in the cabinet, a pair of spaced vertical spirals located midway of the side walls and formed on axial shafts, bearings for the opposite ends of the shafts, a gear connected to the lower end of each shaft, said gears being in intermeshing relation, diametrically disposed pins on one gear, a lever provided with a stop adapted to engage the pins alternately, a magnetic means for moving the lever and stop away from one of the pins, a cam on the lever engageable with the last-mentioned pin for urging the pin forwardly and for initiating rotation of the pin-equipped gear, means preventing reverse rotation of the gear when the stop is moved away from that pin which is engaged by the stop, the weight of the bottles causing rotation of the spirals, said stop and pins limiting each rotation of the spirals to 180 degrees, an electric circuit included in the magnetic means, means for closing said circuit, means actuated by the lever for causing breaking of the circuit, and a spring returning the lever and stop in time for the stop to contact the other pin on the gear, each semi-circular rotation of the spirals causing a bottle to be discharged.

5. A bottle dispensing machine comprising a housing having a dispensing chamber therein, an inclined floor for said chamber leading downwardly to a discharge opening for bottles, a pair of spirals having the vertical axes thereof arranged in a plane passing centrally of the chamber, side walls of the chamber urging bottles of vertical columns on the convolutions of the spirals, said spirals supporting and progressively discharging bottles from the vertical columns, the lower portions of the spirals having a helical formation for progressively lowering and discharging the bottles, the upper portions thereof tapering from the helical formations to the upper free ends, the convolutions of the upper portions having a lesser pitch and supporting the bottles in the columns above the bottles being lowered by the helical portions of said spirals, means causing initial rotation of the spirals, the weight of the bottles supported by the spirals causing further rotation of said spirals, means stopping rotation of the spirals in one direction when a bottle is discharged, means releasing the stopping means at each 180 degree rotation of the spirals, and means causing actuation of the releasing means.

6. A bottle dispensing machine comprising a housing having a dispensing chamber therein, an inclined floor for said chamber leading downwardly to a discharge opening for bottles, a pair of spirals having the vertical axes thereof arranged in a plane passing centrally of the chamber, side walls of the chamber urging bottles of vertical columns on the convolutions of the spirals, said spirals supporting and progressively discharging bottles from the vertical columns, the upper portions of the convolutions of the spirals having a lesser pitch than the lower portions and having a progressively decreasing diameter, said upper portions supporting those sections of the columns of bottles which are above the lower portions of the spirals while the lower sections of the columns are descending and a bottle is being discharged from the chamber, means causing initial rotation of the spirals, the weight of the bottles supported by the spirals causing further rotation of said spirals, means stopping rotation of the spirals in one direction when a bottle is discharged, means releasing the stopping means at each 180 degree rotation of the spirals and means causing actuation of the releasing means.

7. A bottle dispensing machine comprising a housing having a dispensing chamber therein, an inclined floor for said chamber leading downwardly to a discharge opening for bottles, a pair of spirals having the vertical axes thereof arranged in a plane passing centrally through the chamber, a side wall at each side of the plane and spaced therefrom for confining a column of horizontally disposed bottles to each space between a side wall and the intermediately located pair of spirals, the lower portions of the spirals being of helical formation, the upper portions of the spirals tapering from the lower portions to the upper ends thereof, the lower portions of the spirals discharging a bottle alternately from the columns while the upper ends of said spirals support the column from which the bottle is being discharged, the weight of the bottles causing rotation of the spirals, means stopping rotation of the spirals each time said spirals rotate through an angle of 180 degrees, means initiating rotation of the spirals, means releasing the stopping means and means causing actuation of the releasing means.

8. In a bottle dispensing machine having a dispensing chamber therein and an inclined floor for said chamber leading downwardly to a discharge opening for bottles, a pair of spirals having axes in a vertical plane dividing said chamber into vertical paths for the reception of columns of horizontally disposed bottles, the lower portions of the spirals being of helical formation for discharging bottles alternately from the columns onto the inclined floor, the upper ends of the spirals having a lesser pitch than the lower portions thereof and being moved alternately from one column of bottles to the other column for supporting that column from which a bottle is being discharged, the weight of the bottles causing rotation of the spirals, means stopping rotation of said spirals at each 180 degree rotation thereof and after a bottle has been discharged, means causing the stopping means to be released, and resilient means returning the stopping means to an active position to limit rotation of the spirals 180 degrees.

9. In a bottle dispensing machine having a dispensing chamber therein and an inclined floor for said chamber leading downwardly to a discharge opening for bottles, a pair of spirals having axes in a vertical plane dividing said chamber into vertical paths for the reception of columns of horizontally disposed bottles, certain convolutions of the spirals discharging bottles alternately from the columns, other convolutions supporting alternate columns when a bottle is being discharged from a column, the weight of the bottles causing rotation of the spirals, a gear attached to each spiral with the gears intermeshing and rotated by the spirals, diametrically disposed pins on one gear, a lever having one end engageable alternately with the pins for limiting successive rotations of the gear to 180 degrees, means causing temporary release of the lever from one pin and a resilient means returning the lever to engage the other pin before the gears have rotated through an angle of 180 degrees, a bottle being discharged alternately from the columns at each 180 degree revolution of the gears.

10. In a bottle dispensing machine having a dispensing chamber therein and an inclined floor for said chamber leading downwardly to a discharge opening for bottles, a pair of spirals having axes in a vertical plane dividing said chamber into vertical paths for the reception of columns of horizontally disposed bottles, certain convolutions of the spirals discharging bottles alternately from the columns, other convolutions supporting alternate columns when a bottle is being discharged from a column, the weight of the bottles causing rotation of the spirals, a gear attached to each spiral with the gears intermeshing and rotated by the spirals, diametrically disposed pins on one gear, a lever having one end engageable alternately with the pins for limiting successive rotation of the gears to 180 degrees, means causing temporary release of the lever from one pin, a cam on the lever and engageable with the engaged pin for moving the pin forwardly and initiating rotation of the gears and spirals, and a resilient means returning the lever to engage the other pin before the gears have rotated through an angle of 180 degrees, a bottle being discharged alternately from the columns at each 180 degrees of revolution of the gears.

11. In a bottle dispensing machine having a dispensing chamber therein and an inclined floor for said chamber leading downwardly to a discharge opening for bottles, a pair of spirals having axes in a vertical plane dividing said chamber into vertical paths for reception of columns of horizontally disposed bottles, certain convolutions of the spirals discharging bottles alternately from the columns, other convolutions supporting alternate columns when a bottle is being discharged from a column, the weight of the bottles causing rotation of the spirals, a gear attached to each spiral with the gears intermeshing and rotated by the spirals, diametrically disposed pins on one gear, a lever having one end engageable alternately with the pins for limiting successive rotations of the gear to 180 degrees, means causing temporary release of the lever from one pin, and means contacting one of the pins after the rotation of the gears has been stopped for preventing reverse rotation of the gears.

12. In an article dispensing machine having a dispensing chamber therein and an inclined floor for said chamber leading downwardly to a discharge opening for the articles, a pair of spirals having axes in a vertical plane dividing said chamber into vertical paths for the reception of columns of horizontally disposed articles, certain of the convolutions of the spirals discharging articles alternately from the columns, other convolutions supporting alternate columns when an article is being discharged from a column, the weight of the articles causing rotation of the spirals, a gear attached to each spiral with the gears intermeshing, diametrically disposed pins projecting from one gear, a lever pivoted at one end, the free end of the lever engaging the pins alternately to provide a 180 degree rotation of the gears, a magnetic means drawing the free end of the lever away from the engaged pin, means momentarily energizing the magnetic means, and a spring returning the lever for engagement with a pin which is moving toward the free end of the returning lever for stopping the rotating gears and spirals.

13. In an article dispensing machine having a dispensing chamber therein and an inclined floor for said chamber leading downwardly to a discharge opening for the articles, a pair of spirals having axes in a vertical plane dividing said chamber into vertical paths for the reception of columns of horizontally disposed articles, certain of the convolutions of the spirals discharging articles alternately from the columns, other convolutions supporting alternate columns when an article is being discharged from a column, the weight of the articles causing rotation of the spirals, a gear attached to each spiral with the gears intermeshing, diametrically disposed pins projecting from one gear, a lever pivoted at one end, the free end of the lever engaging the pins alternately to provide a 180 degree rotation of the gears, a magnetic means drawing the free end of the lever away from the engaged pin, means momentarily energizing the magnetic means, the moving lever provided with a cam contacting the pin which is engaged by the free end of said levers for urging the pin forwardly to initiate rotation of the gears and spirals, and a spring returning the lever for engagement with a pin which is moving toward the free end of the returning lever for stopping the rotation of the gears and spirals.

14. In an article dispensing machine having a dispensing chamber therein and in inclined floor for said chamber leading downwardly to a discharge opening for the articles, a pair of spirals having axes in a vertical plane dividing said chamber into vertical paths for the reception of columns of horizontally disposed articles, the weight of the articles causing rotation of the spirals, said spirals discharging articles alternately from the columns, means connecting the spirals for simultaneous but reverse rotation, means limiting the spirals to successive rotations of 180 degress and including a lever engaging alternately diametrically opposite points on the connecting means, a magnetic means moving the lever to an inoperative position, a spring returning said lever, an electric circuit including the magnetic means, a switch in the circuit, means acted on by the articles in the columns for closing the switch, a second switch in the circuit being closed by the operator for completing the circuit to the magnetic means, a second circuit, a switch in said circuit, means operated by the lever when in an operative position for retaining the last mentioned switch open, and means in the second circuit for causing opening of the second switch when the lever has been rocked away from the connecting means, the return of the lever by the spring causing opening of the switch in the second circuit.

15. In an article dispensing machine having a dispensing chamber therein and an inclined floor for said chamber leading downwardly to a discharge opening for the articles, a pair of spirals having axes in a vertical plane dividing said chamber into vertical paths for the reception of articles, the weight of the articles causing rotation of the spirals, said spirals discharging articles alternately from the columns while supporting said columns, means connecting the spirals for simultaneous but reverse rotation, means limiting the spirals to successive rotations of 180 degrees and including a lever engaging alternately diametrically opposite points on the connecting means, a magnetic means for moving the lever to an inoperative position, a spring returning said lever, an electric circuit including the magnetic means, a switch in the circuit, means acted on by the articles in the columns for closing the switch, means in the dispensing chamber for maintaining the bottles in operative engagement with the last mentioned means, a second switch in the circuit being closed by the operator for completing the circuit to the magnetic means, a second circuit, a switch in said circuit, means operated by the lever when in an operative position for retaining the last mentioned switch open, and means in the second circuit for causing opening of the second switch when the lever has been rocked away from the connecting means, the return of the lever by the spring causing opening of the switch in the second circuit.

16. In an article dispensing machine having a dispensing chamber and an inclined floor leading to a discharge opening for the articles, a pair of spirals having axes in a vertical plane for dividing said chamber into vertical paths for columns of horizontally disposed articles. the weight of the articles causing rotation of the spirals, said spirals discharging articles alternately from the columns while supporting the columns, means causing the spirals to rotate in opposite directions, means limiting the spirals to a step-by-step rotation and including a magnetic means and a laver adapted to engage alternately diametrically opposite points on the reversing means and stop rotation of the spirals, an electric circuit including the magnetic means, a switch in the circuit, a closing means for the switch, a spring-pressed swingable plate at one end of the dispensing chamber and pressed against the closing means by an article at the lower end of a column for retaining the switch closed, adjustable guides at the other end of the chamber for maintaining the articles against the plate, a second switch in the circuit, means closing said switch temporarily to complete the closing of the circuit to energize the magnetic means, said magnetic means moving the lever away from the reversing means, and a resilient means returning said lever.

17. An article dispensing machine comprising a housing including a pair of compartments for storage of articles to be dispensed, a pair of vertically disposed spirals below said compartments arranged one in front of the other and receiving articles horizontally disposed on opposite convolutions of said spirals, gear means permitting simultaneous rotation of said spirals under weight of the articles, the convolutions of the spirals being constructed with the upper portions having a lesser pitch than the lower portions thereof so as to support articles at the high level when the lowermost article is being dispensed, and releasable stop means for said spirals.

RUDOLF BALZER.

REFERENCES CITED

The following references are of record in the file of this patent:

UNITED STATES PATENTS

| Number | Name | Date |
|---|---|---|
| 1,301,074 | Melchert et al. | Apr. 15, 1919 |
| 2,200,228 | Simmons | May 7, 1940 |
| 2,304,484 | Smith | Dec. 8, 1942 |
| 2,405,891 | Larimore | Aug. 13, 1946 |

FOREIGN PATENTS

| Number | Country | Date |
|---|---|---|
| 2,148 | Great Britain | 1914 |